United States Patent [19]
Williams

[11] 4,361,381
[45] Nov. 30, 1982

[54] OPTICAL CABLE

[75] Inventor: Robert J. Williams, Kanata, Canada

[73] Assignee: Northern Telecom Limited, Montreal, Canada

[21] Appl. No.: 194,447

[22] Filed: Oct. 6, 1980

[51] Int. Cl.³ .......................... G02B 5/14; G02B 5/16
[52] U.S. Cl. ............................... 350/96.23; 350/96.24
[58] Field of Search ...................... 350/96.23, 96.24; 250/227

[56] References Cited

U.S. PATENT DOCUMENTS

| | | | |
|---|---|---|---|
| 4,154,049 | 5/1979 | King et al. | 350/96.23 |
| 4,199,224 | 4/1980 | Oestrich | 350/96.23 |

FOREIGN PATENT DOCUMENTS 2017967 10/1979 United Kingdom ............. 350/96.23

*Primary Examiner*—Marvin L. Nussbaum
*Attorney, Agent, or Firm*—R. J. Austin

[57] ABSTRACT

Optical cable with waveguides received in recesses of a crush resistant central core, and a protective sheath surrounding the core, an inner layer of the sheath comprising metal and being carried upon ribs of the core which define the recesses. The metal layer may be corrugated circumferentially and coated with polymeric material. An outer layer of the sheath is an impermeable polymeric material. The ribs preferably extend along the core at an angle to its axis.

6 Claims, 4 Drawing Figures

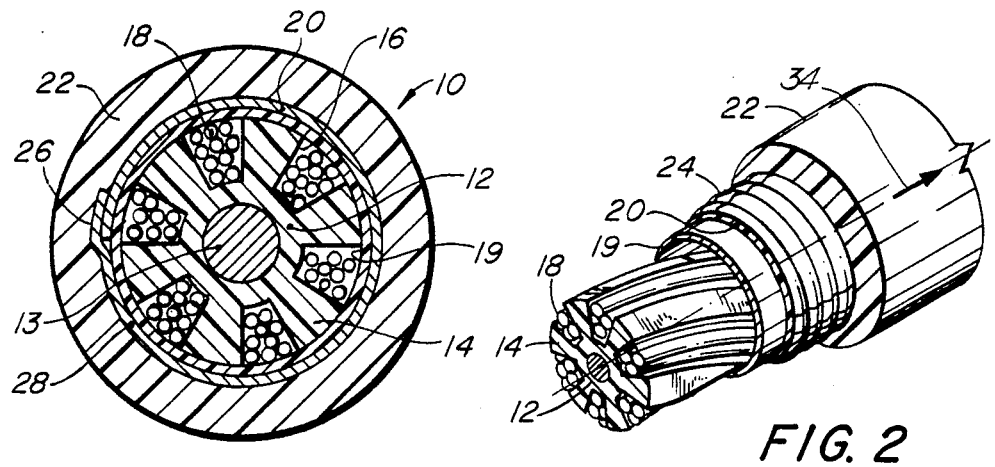
FIG. 1
FIG. 2
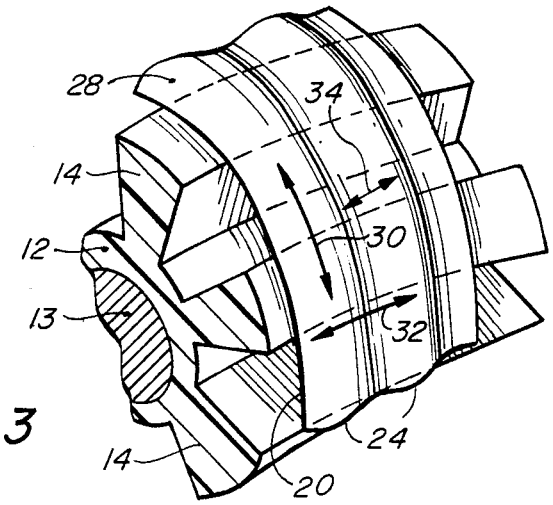
FIG. 3
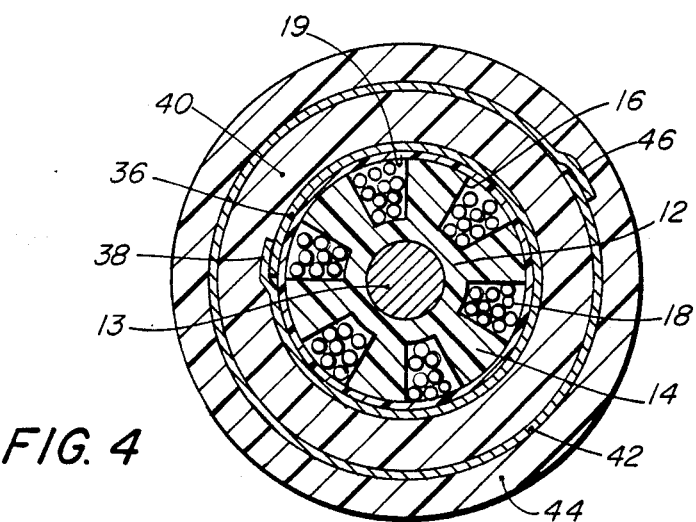
FIG. 4

OPTICAL CABLE

This invention relates to optical cable.

Optical cable comprises a plurality of optical waveguides which need to be protected by water impermeable sheathing layers. As optical waveguides tend to suffer markedly from transmission attenuation problems if they are cut into, have surface damage, or are subjected to sudden changes in path, then it is of paramount importance to minimize the possibilities of damage to them after installation of a cable.

One problem which exists is the provision of an optical cable construction which will provide maximum protection to waveguides against crushing loads when the cable is buried, for instance, in rocky terrains.

According to the present invention, an optical cable comprises a longitudinally extending crush resistant central core formed with a plurality of circumferentially spaced longitudinally extending ribs defining grooves between the ribs, a plurality of waveguides extending along the grooves, and a protective sheath surrounding the core and waveguides, the sheath comprising an inner metal layer and an outer water impermeable polymeric layer, the metal layer extending around the core and being carried upon outer ends of the ribs.

With the above construction according to the invention, if the metal layer is subjected to any crushing load, for instance in a position between adjacent core ribs, the circumferential part of the layer between the ribs becomes stiffened by the presence of and distance between the ribs and the load tends to become dissipated down the ribs, through the core and out through ribs diametrically opposite. The load dissipation and stiffening of the metal layer causes it to deform inwardly, at the point of load application, to a far lesser extent than would be the case if no central core were provided. Opposition to inward deformation is also caused by resistance to inward deformation of the metal layer directly over the ribs themselves. Hence, part from the stiffening effect upon the part of the layer between the ribs at which the load is applied, there is also a stiffening effect upon the whole layer by virtue of the proximity of each of the ribs to the layer, and which resists any distortion of the layer from a circular towards an oblate cross-section.

In a preferred arrangement, the metal layer is coated with a polymeric material on its outer surface, the polymer being compatible with the polymeric layer so as to be blended or bonded to it under the action of heat. The metal layer is advantageously provided with a coating of the polymer on both of its surfaces, the ends of the layer being overlapped to form a longitudinal overlap in which the coatings from the two surfaces are bonded together.

It is advantageous for the metal layer to be formed with circumferentially extending corrugations as this increases its stiffness. In addition or alternatively, stiffness of any particular part of the metal layer between ribs is increased if the ribs extend along the core while lying at an angle to the core axis. This rib configuration forms a semi-box structure between adjacent ribs and the part of the metal layer extending between them, in that this part of the layer, in addition to being of arcuate cross-section circumferentially, also extends around the axis of the core. This latter also produces a curve along the length of each part of the layer which stiffens it. Further, the angled ribs oppose each other axially of the core and resist any tendency for any deformation to the metal layer to extend axially beyond the ribs.

Embodiments of the invention will now be described, by way of example, with reference to the accompanying drawings in which:

FIG. 1 is a cross-sectional view of an optical cable according to a first embodiment;

FIG. 2 is a isometric view, partly cut away, of the cable of the first embodiment;

FIG. 3 is an isometric view, in the direction of arrow III in FIG. 1, of part of a metal layer covering part of a core of the cable; and FIG. 4 is a view, similar to FIG. 1, of a second embodiment.

In a first embodiment, as shown in FIGS. 1 and 2, an optical cable 10 comprises a crush resistant core 12 surrounding a steel strength member 13, the core 12 having been formed from extruded plastics material such as high density polyethylene. The core is extruded with a plurality, i.e. six, circumferentially spaced ribs 14 which extend longitudinally of the core. The ribs may extend strictly in an axial direction but in the preferred arrangement as in this embodiment, the ribs lie at an angle to the core axis. This angle may be produced either by the ribs extending helically or sinusoidally along the core.

The ribs have circumferentially wide outer ends and define tapering grooves 16 between them. In this embodiment, the dimensions of the core 12 and strength member 13 are as follows. The member 13 has a diameter of about 3.2 mm and the base diameter of grooves 16 is about 6 mm. The outside diameter of the ribs is approximately 10 mm and each has a flat outer surface between 2.24 and 2.3 mm wide.

Each of these grooves 16 carries a plurality of optical waveguides 18 which are sufficiently loosely contained therein to avoid any external pressure upon the waveguides, created by heat expansion or shrinkage of the cable, such as may increase the attenuation of the waveguides.

Surrounding the core and waveguides is a core wrap 19 of 0.003 mm thick polyester which may be that sold under the trademark "Mylar" ®. Around the core wrap is a protective sheath comprising a metal inner layer 20 and an outer water impermeable polymeric layer 22. The inner layer may be of any metal to provide the required crush resistance requirements of the cable. In this case, the metal is steel of approximately 0.006 inches thickness, the steel being coated on both surfaces with polyethylene to a thickness of 0.002 inches. The inner layer is formed with circumferential corrugations 24 (FIGS. 2 and 3) and ends 26 of the layer are overlapped as shown by FIG. 1.

The layer 22 is about 1.4 mm thick and is formed of a polymeric material which is compatible with the coating material on the inner layer so as to blend with or bond with the coating material under the action of heat. The outer layer is advantageously formed from a polyolefin, therefore, which in this case is medium density polyethylene, the outer layer being extruded over the inner layer by accepted extrusion techniques. The heat in the polyethylene during extrusion is sufficient to cause softening of the outer coating on the metal so as to blend and bond with it. In addition, at the overlapped metal ends 26, opposing coats on the metal which are in contact are caused to flow together by virtue of heat of extrusion, thereby providing a moisture proof barrier between the ends.

The structure of the cable is such that it may be flexed in the normal manner for laying purposes. However, it is particularly resistant to crushing loads such as may be applied by the pressure of rocks when buried beneath the ground. The reasons for this are manifold as will now be explained.

Firstly, the inner metal layer is carried upon the outer ends of the ribs 14 whereby any circumferential part 28 of the inner layer extending between adjacent ribs 14 acts partly like a beam. Any crushing load acting upon part 28 produces a bending moment which is minimized by the short distance between the ribs and this reduces any tendency for the metal to be deformed inwardly. The load is, in fact, taken through the ribs, through the member 13 and through other ribs diametrically opposite through the core. Further, the supporting contact of the ribs with the metal layer at spaced positions, the wide area of contact between the ribs and layer and the fact that the ribs extend angularly around the core, assist in stiffening the metal layer against inward deformation and resists any distortion of the layer from a circular towards an oblate cross-section.

In addition, while the convex curvature of the metal layer taken in a strictly circumferential direction (as shown by arrow 30 in FIG. 3) resists inward deformation by virtue of the shape, any part 28 of the layer also curves in the direction of arrow 32, i.e. in the direction parallel to the ribs 14. This curvature in two directions assists in stiffening the metal layer locally to resist inward deformation even if the layer is not corrugated as described in this embodiment.

Further, because the ribs are angularly disposed around the core, the axial distance, for instance along line 34 in FIG. 3, between the ribs, strengthens each part of the metal layer in the axial direction whereby the ribs strengthen the metal layer against deformation in the axial direction. This would be the case even if the metal layer were not corrugated. Clearly, however, maximum resistance to deformation is provided where the ribs extend at an angle to the core axis and also at an angle to the corrugations in the metal layer.

A further feature which adds to resistance to deformation is the laminate structure of the metal layer with its inner and outer surface coatings and this is enhanced by the bonding of the outer layer 22 to the outer surface coating.

If a crushing load is applied which deforms any part 28 of the metal inner layer inwardly sufficiently to damage waveguides in the underlying groove 16, there is an excellent possibility that damage does not extend to waveguides in other grooves 16. This is partly because the cable structure causes damage to be localized as the metal layer is supported at spaced positions by the ribs. It is also because the ribs and metal layer form closed cells of the grooves and crushing loads which would otherwise deform the metal layer for substantial distances around its circumference, are not taken around the circumference but are instead dissipated down the ribs as has been described. Thus any load passing to parts 28 of the metal layer flanking a part 28 directly affected by the loads, are minimized and thus are not so easily deformed.

In addition to the above advantages, the cable is impermeable and offers positive resistance to destruction by gnawing and burrowing animals. While the outer polymeric layer may possibly be eaten through by a gnawing animal, it will not be capable of gnawing through the metal layer. The outer coating on the metal layer gives excellent resistance to deterioration by rusting and localizes any tendency to rust if the coating is removed at one position by gnawing.

In a second embodiment, as shown in FIG. 4, in which parts similar to those in the first embodiment bear the same numerals, an optical cable is provided with an inner aluminum layer 36 of, perhaps, 0.008 inch thickness coated on both sides with a 0.002 inch thickness polyethylene layer. The aluminum layer is of the same structure as the layer 20 in the first embodiment. The opposing surface coatings at overlapping ends 38 of the layer 36 are bonded together through the heat transmitted during the extrusion of an overlying layer 40 of medium density polyethylene.

Outwardly of the layer 40 is another metal layer 42 formed from steel about 0.006 inches thick, and coated on both surfaces with a 0.002 inch thickness polyethylene layer. An outermost insulating layer 44 of medium density polyethylene is bonded to the outer coating of the steel and the surface coatings at overlapped ends 46 of metal layer 42 are bonded together.

This construction, which is stronger than that of the first embodiment, offers greater resistance to deformation of the same reasons expressed above. In this case, however, the steel and aluminum layers act together to resist deformation. The aluminum is particularly useful for electrical shielding in a case where electrical transmission wiring also is located in grooves 16 in addition to the optical waveguides.

What is claimed is:

1. An optical cable comprising a longitudinally extending crush resistant central core formed with a plurality of circumferentially spaced, longitudinally extending ribs defining grooves between the ribs, a plurality of waveguides extending along the grooves, and a protective sheath surrounding the core and waveguides, the sheath comprising an inner metal layer and an outer water impermeable polymeric layer, the metal layer extending around the core to be carried upon outer ends of the ribs and the metal layer formed with circumferentially extending corrugations.

2. A cable according to claim 1 wherein the ribs extend along the core and lie at an angle to the core axis.

3. A cable according to claim 1 wherein the metal layer has overlapped ends to form an axially extending overlap, the metal layer is coated on its outer surface with a polymeric material, said material being compatible with the polymeric layer, and the polymeric layer being an extruded layer and being heat bonded to the coating layer.

4. A cable according to claim 3 wherein both surfaces of the metal layer are coated with the polymeric material, and the two coatings are bonded together at the overlapped ends.

5. A cable according to claim 1 wherein the protective sheath further includes another metal layer surrounding said outer water impermeable layer, and a further water impermeable polymeric layer surrounds said other metal layer.

6. An optical cable comprising a longitudinally extending crush resistant central core formed with a plurality of circumferentially spaced ribs which extend longitudinally of the core and around the core at an angle of the axis of the core, the ribs being tapered towards their inner ends and defining grooves between the ribs, a plurality of waveguides extending along the grooves, and a protective sheath surrounding the core and waveguides, the sheath comprising an inner metal layer having corrugations lying at a different angle to the core axis from the angle of the ribs, overlapped ends to form an axially extending overlap, and a coating on its outer surface of a polymeric material, the sheath also comprising a layer outwardly of the metal layer of polymeric material compatible with and bonded to the polymeric material of the coating.

* * * * *